United States Patent [19]

Marques et al.

[11] Patent Number: 5,490,394
[45] Date of Patent: Feb. 13, 1996

[54] FAN CONTROL SYSTEM FOR THE EVAPORATOR OF REFRIGERATING APPLIANCES

[75] Inventors: Marco E. Marques; Roberto D. Brun, both of Joinville, S.C.

[73] Assignee: Multibrás S/A Eletrodomésticos, São Paulo, Brazil

[21] Appl. No.: 311,775

[22] Filed: Sep. 23, 1994

[51] Int. Cl.⁶ .................................................. F25D 17/06
[52] U.S. Cl. ................... 62/186; 62/131; 62/209
[58] Field of Search ............................. 62/186, 158, 182, 62/208, 209, 131, 180, 229

[56] References Cited

U.S. PATENT DOCUMENTS

| | | | |
|---|---|---|---|
| 4,941,325 | 7/1990 | Nuding | 62/182 X |
| 4,949,548 | 8/1990 | Meyer | 62/180 X |
| 5,142,880 | 9/1992 | Bellis | 62/186 X |
| 5,228,307 | 7/1993 | Koce | 62/158 X |
| 5,269,152 | 12/1993 | Park | 62/186 X |

Primary Examiner—Harry B. Tanner
Attorney, Agent, or Firm—Darby & Darby

[57] ABSTRACT

A fan control system for the evaporator of refrigerating appliances, of the type in which the internal air is forced to circulate, by action of a fan (20), through the evaporator (30) of a refrigerating circuit, fed by a compressor (40), the system comprising: a first temperature sensing means (S1), detecting the temperature of the circulating air at the air inlet of the evaporator (30); a second temperature sensing means (S2), detecting the temperature of the evaporator (30); and a control circuit (50), producing: a fan stop control signal, when the difference between the values of the temperatures detected by the first and second sensors (S1, S2) reaches a stop value, below which the heat transfer from the forced circulating air to the evaporator is lower than the heat transfer from the fan (20) to the air; and a fan start control signal, when the difference of temperatures reaches a certain start value corresponding to a temperature of the evaporator (30) substantially lower than the temperature of the air in the internal medium.

8 Claims, 3 Drawing Sheets

FAN CONTROL SYSTEM FOR THE EVAPORATOR OF REFRIGERATING APPLIANCES

FIELD OF THE INVENTION

The present invention refers to a fan control system for the evaporator of refrigerating appliances, such as refrigerators, freezers, some types of air conditioners, as well as any other refrigerating device using evaporators with forced ventilation, i.e., provided with fans for the circulation of air in the medium to be refrigerated.

BACKGROUND OF THE INVENTION

The refrigerating systems of the present state of the art, which are provided with evaporators with forced ventilation, are controlled by an actuating-transducer device, in the form of a thermostat mounted at a region in the surroundings of the air inlet of the fan, the latter usually being disposed at the region of minimum temperature of the circulating air, i.e., immediately upstream of the evaporator. With the thermostat being so disposed, it simultaneously switches on and off the compressor and the fan, at respective maximum and minimum predetermined temperatures of the air at this region.

The constructions as described above have a yielding and an energy consumption below the optimum possible levels. As soon as the air drawn to the fan reaches its minimum predetermined temperature, deactivating the thermostat and consequently stopping the compressor and the fan, there occurs an air tightness in the circuit. The tightened air will be rapidly heated throughout the circuit, whereas in the surroundings of the evaporator its temperature will fall to unnecessarily low levels, with the low temperature available being not used. The quick temperature increase of the air in the vicinity of the thermostat will cause the frequent actuation of the compressor and fan, with each restart thereof resulting in a corresponding peak of energy consumption.

Moreover, the known refrigerating appliances, particularly refrigerators and freezers, have an undesirable additional heat gain when, during the fan operation, the cabinet door is opened. In such situation, the fan draws the environmental air of higher temperature to the heat exchanging air flow, causing the additional operation of the refrigerating unit.

As evidenced, the available refrigerating appliances present a low thermal yielding, due to the nonutilization of the low temperature of the evaporator, when the fan and compressor are simultaneously switched off, and to the high amount of heat admitted from the outside, when the cabinet door is opened. Said appliances further present a high consumption of electrical energy, due to the frequent operation of the compressor and to the frequent peak currents consumed during the restarts of both the compressor and fan.

BRIEF DESCRIPTION OF THE INVENTION

Thus, it is an object of the present invention to provide a fan control system for the evaporator of refrigerating appliances, which enables a substantial reduction in the consumption of electrical energy.

It is also an object of the present invention to provide a fan control system for an evaporator, as described above, which provides the appliance with an optimized thermal yielding.

It is a further object of the present invention to provide a fan control system as described above, which minimizes the undesirable thermal exchanges with the environment.

These and other objectives and advantages of the present invention are achieved through the provision of a fan control system for the evaporator of refrigerating appliances of the type in which the internal air is forced to circulate, by action of a fan, through the evaporator of a refrigerating circuit, supplied by a compressor, said system comprising:

a first temperature sensing means, disposed to detect the temperature of the air inside the refrigerating appliance at the air inlet of the evaporator;

a second temperature sensing means, disposed to detect the temperature of the evaporator;

a control circuit, operatively connected to the first and second temperature sensors and to the fan and producing, in response to the temperature values detected by said sensors:

a fan stop control signal, when the difference between the values of the temperature detected by said first and second sensors reaches a stop value, below which the heat transfer from the circulating air forced to the evaporator is lower than the heat transfer from the fan to said air;

and a fan start control signal, when said difference between the temperature values reaches, with the reduction of the temperature of the evaporator due to the compressor operation, a certain start value corresponding to a temperature of the evaporator substantially lower than the temperature of the air in the internal medium.

In practical terms, the use of the present invention will allow, after the compressor stop, the independent operation of the fan, making use of the low temperature of the evaporator, in order to continue the cooling of the forced air flow, up to the limit in which the heat dissipated by the fan is greater than the gain obtained in the evaporator, when the fan will be switched off. The restart of the fan is equally independent from the actuation of the compressor and it only occurs upon reaching a predetermined difference of temperature between the medium air and the evaporator. Such operational characteristic enables a substantial thermal gain, corresponding to the total use of the low temperature of the evaporator, as well as a reasonable economy of electrical energy, due to the less frequent peak currents when the compressor is activated, and due to the larger periods of the compressor stop and corresponding larger periods of the fan operation, which consumes less energy.

Moreover, the present invention allows the fan to be mounted with a switch, which is activated at the door of the refrigerator or freezer, in order to switch off the fan when the door is opened, thereby avoiding the introduction into the cabinet, by aspiration, of a highly undesirable amount of outside air with a relatively high temperature. Thus, there is obtained an additional thermal gain and a consequent economy of the energy that would be needed to reduce the temperature of the external air admitted inside the medium under refrigeration, to the operative temperature of the refrigerating appliance.

BRIEF DESCRIPTION OF THE DRAWINGS

The invention will be described below, with reference to the attached drawings, in which.

DESCRIPTION OF THE PREFERRED EMBODIMENTS

Figure 1:
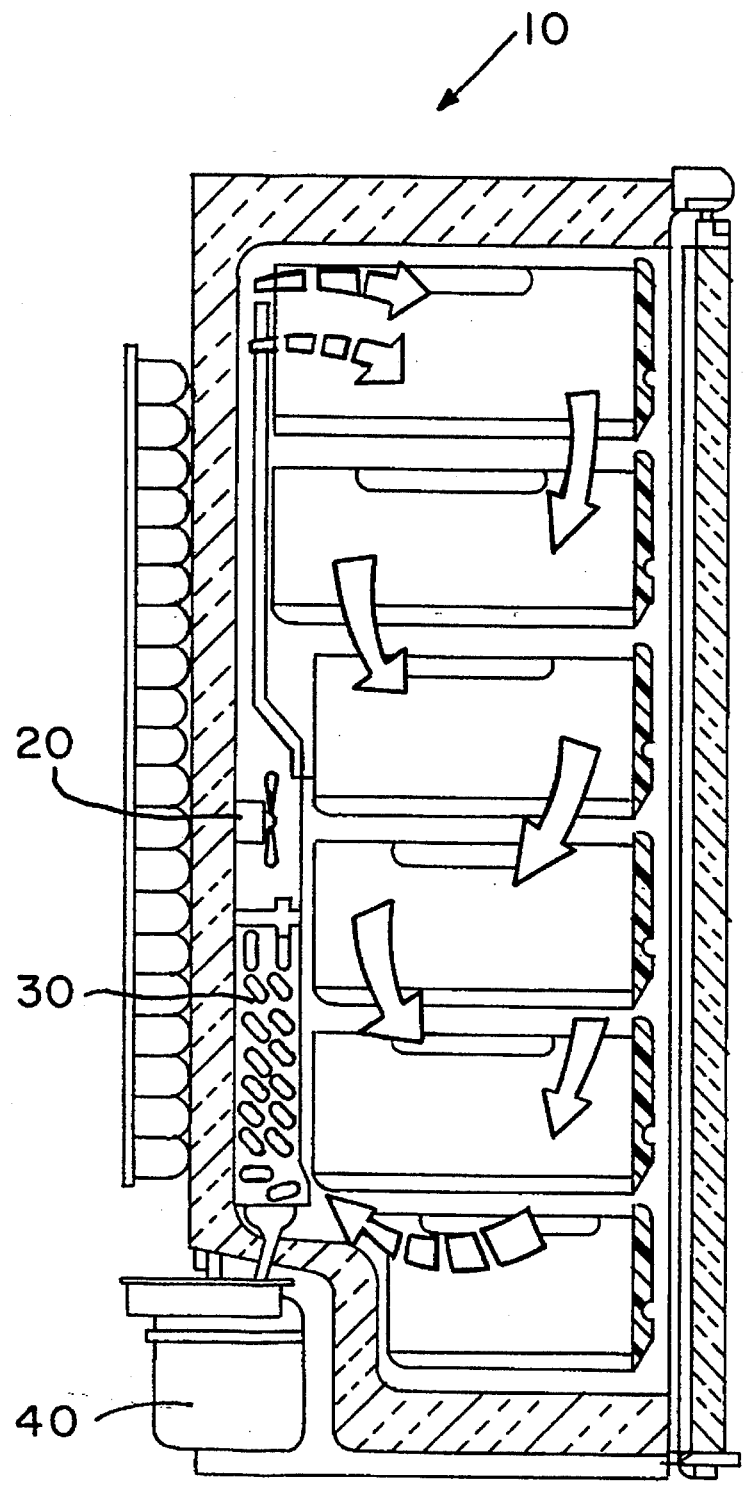
FIG. 1 is a sectional lateral view of a vertical freezer, with the physical disposition of the various elements of the invention.
Figure 2:
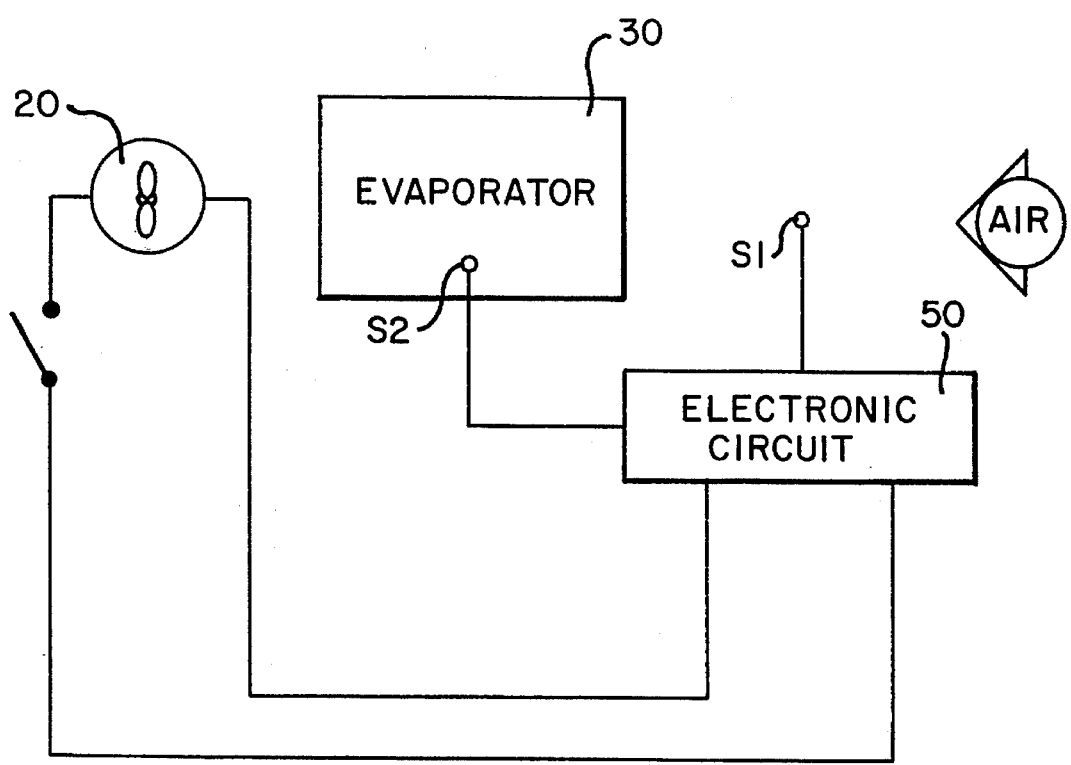
FIG. 2 shows, schematically, a diagram of the elements constituting the control system in question.

According to the above described figures, the present control system is used in refrigerating systems, such as a vertical freezer 10, of the type in which the air of the internal medium to be refrigerated is forced by a fan 20 to circulate, passing through an evaporator 30, which is also disposed inside the medium to be refrigerated and connected to the refrigerating circuit fed by a compressor 40.

As already mentioned, the present system allows the fan 20 to have its actuation controlled independently from the operation of the compressor 40. For this purpose, the control system comprises a first temperature sensor S1, disposed at the point where forced circulating air passes immediately upstream of the evaporator 30, and a second temperature sensor S2, disposed in contact with the evaporator 30. The localization of the first and second sensors S1 and S2 enables them to detect the extreme temperatures of the cycle of the circulating air, i.e., the temperature of the internal air that reaches the evaporator 30 and the temperature of the latter. These two first sensors S1 and S2 are operatively connected to an electronic control circuit 50, which is constructed in order to switch on and off the fan 20, in function of the difference of the temperatures detected by said sensors.

Figure 3:
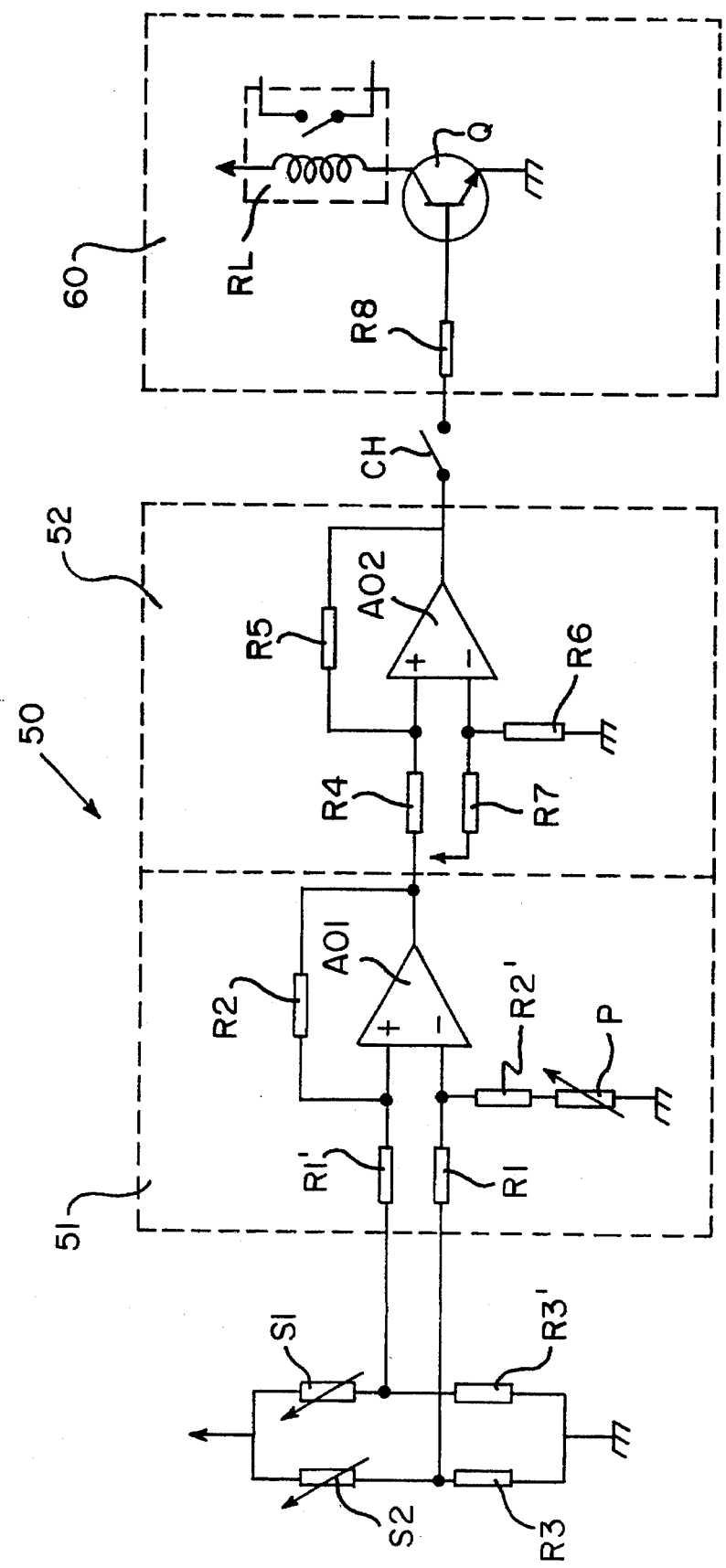
FIG. 3 illustrates a possible control circuit for the present system.

As illustrated in FIG. 3, the electronic circuit 50 comprises a differential amplifier 51 and a thermostat circuit 52. The differential amplifier 51 is formed, in the illustrated example, by two pairs of first and second resistors R1, R1', R2 and R2' and by a potentiometer P, which are adequately connected to a first operative amplifier A01, that transforms the difference of the temperatures detected by said first and second sensors S1 and S2 in a voltage signal. In the illustrated construction, both sensors S1 and S2 are defined by two NTCs which, together with a pair of third resistors R3 and R3', form a resistive bridge to the input of the first operative amplifier A01.

The output of the differential amplifier 51 is connected to the thermostat circuit 52, which is formed by fourth, fifth, sixth and seventh resistors R4, R5, R6 and R7, together with a second operative amplifier A02. This circuit allows that the on and off differentials be different one from the other. The connection between the thermostat circuit 52 and a switching circuit 60 of the fan 20 is made through a door switch CH, whose function is to stop the fan 20 when the door of the freezer or refrigerator is opened, interrupting the circulation of forced air in this open door condition.

The switching circuit 60 comprises an eighth resistor R8, connected to the base of a transistor Q, connected to the coil of a relay RL for supplying the fan 20. When the thermostat circuit 52 sends a voltage signal, through the eighth resistor R8, to the base of the transistor Q, the latter overloads, powering the coil of the relay RL and activating the fan 20. When there is no voltage at the base of the transistor Q, the latter cuts off, deenergizing the coil of the relay RL and stopping the fan.

With the construction described above, the operation of the fan 20 will depend upon the temperature differential between the circulating air arriving to the evaporator 30 and the inside of the latter.

Thus, when the compressor 40 of the refrigerating circuit is stopped by a respective thermostat of conventional construction (not illustrated), the fan 20 will go on working, till a minimum limit of temperature difference is established by the sensors. The low temperature of the evaporator 30 is therefore used to cool the forced circulating air, though the compressor 40 is not working. The operation of the fan is maintained, till the differential of the temperatures sensed by the first and second sensors S1 and S2 reaches said predetermined minimum limit, when the heat dissipated by the motor of the fan will be higher than the cooling of the air passing through the evaporator 30.

When said minimum limit is reached, the fan 20 is switched off.

When the temperature inside the appliance reaches the maximum limit for activating the compressor 40, the latter restarts to work, till it stops again, when the medium temperature reaches the predetermined minimum value for the refrigerating system. The activation of the compressor 40 by the respective thermostat will not cause the activation of the fan 20, which will remain inactive, until there is detected again by the first and second sensors S1 and S2 and electronic circuit 50, a certain minimum temperature difference, between the air admitted into the evaporator 30 and the inside of the latter, in order to permit the operation of the fan, which restarts working.

This operational characteristic of maintaining the fan inactive when the compressor starts a new operative cycle, allows the evaporator to cool faster and avoids the dissipation of heat from the fan motor, until the evaporator is sufficiently cooled.

Besides the operational advantage cited above, the fan has its operation interrupted by the switch CH, whenever the door of the refrigerating appliance is opened.

We claim:

1. A fan control system for the evaporator of refrigerating appliances, of the type in which the internal air is forced to circulate, by action of a fan, through the evaporator of a refrigerating circuit, fed by a compressor comprising:

a first temperature sensing means disposed to detect the temperature of the air inside the refrigerating appliance at the air inlet of the evaporator;

a second temperature sensing means disposed to detect the temperature of the evaporator;

a control circuit, operatively connected to said first and second temperature sensors and to said fan and producing, in response to the temperature values detected by said sensors: a fan stop control signal, when the difference between the values of the temperature detected by said first and second sensors reaches a stop value, below which the heat transfer from the forced circulating air to the evaporator is lower than the heat transfer from said fan to said air; and a fan start control signal, when said difference between the temperature values reaches, with the reduction of the temperature of the evaporator, due to the compressor operation, a certain start value corresponding to a temperature of the evaporator substantially lower than the temperature of the air in the internal medium.

2. The fan control system, as in claim 1, wherein the control circuit is connected to the fan through a switch that interrupts the supply to the fan when the door of the refrigerating appliance is opened.

3. The fan control system, as in any of the claims 1 or 2, wherein the control circuit comprises: a differential amplifier operatively connected to both the first and second temperature sensors, to transform the difference of the temperatures detected by said sensors into a voltage signal; and a thermostat circuit connected to both the output of the differential amplifier and fan.

4. The fan control system, as in claim 3, wherein the differential amplifier is formed by a first operational amplifier, connected to both the first and second temperature sensors through a pair of first resistors disposed parallely with a pair of second resistors, one of them being in series with a grounded potentiometer and the other connected to the output of the first operational amplifier.

5. The fan control system, as in claim 4, wherein both sensors are defined by two NTCs which, together with a pair of respective third grounded resistors form a resistive bridge to the input of the first operational amplifier.

6. The fan control system, as in claim 4, wherein the thermostat circuit includes a second operational amplifier disposed in series with fourth and seventh resistors and parallel to a fifth resistor and a sixth grounded resistor.

7. The fan control system, as in claim 6, wherein the fan includes a switching circuit formed by a transistor with its base connected to the output of the second operational amplifier through an eighth resistor, said transistor being grounded and connected to the coil of a relay for energizing the fan.

8. A fan control system, as in claim 2, characterized in that the control circuit (50) comprises: a differential amplifier (51) operatively connected to both the first and second temperature sensors (S1, S2), to transform the difference of the temperatures detected by said sensors into a voltage signal; and a thermostat circuit (52) connected to both the output of the differential amplifier (51) and fan (20).

\* \* \* \* \*